US009510166B1

(12) United States Patent
Allen et al.

(10) Patent No.: US 9,510,166 B1
(45) Date of Patent: Nov. 29, 2016

(54) MERGING ACTIVE GROUP CALLS

(71) Applicant: BlackBerry Limited, Waterloo (CA)

(72) Inventors: Andrew Michael Allen, Hallandale Beach, FL (US); Adrian Buckley, Tracy, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/754,023

(22) Filed: Jun. 29, 2015

(51) Int. Cl.
*H04B 7/00* (2006.01)
*H04W 4/10* (2009.01)
*H04W 4/08* (2009.01)
*H04L 12/18* (2006.01)

(52) U.S. Cl.
CPC .............. *H04W 4/10* (2013.01); *H04W 4/08* (2013.01); *H04L 12/189* (2013.01)

(58) Field of Classification Search
USPC ................................................ 455/517–520
See application file for complete search history.

(56) References Cited

U.S. PATENT DOCUMENTS

| 5,369,783 | A * | 11/1994 | Childress | H04W 84/08 455/17 |
| 7,693,533 | B2 * | 4/2010 | Sung | H04W 4/10 370/260 |
| 7,933,621 | B1 * | 4/2011 | Vu | H04W 4/08 455/518 |
| 2006/0035656 | A1 * | 2/2006 | Sung | H04W 4/10 455/518 |
| 2007/0019595 | A1 * | 1/2007 | Huh | H04L 12/1818 370/338 |

FOREIGN PATENT DOCUMENTS

| WO | 2006/011770 | 2/2006 |
| WO | 2008/082203 | 7/2008 |
| WO | 2009/121406 | 10/2009 |

OTHER PUBLICATIONS

3GPP TR 23.779 v0.8.0 "Study on application architecture to support Mission Critical Push to Talk over LTE (MCPTT) services," Jun. 2015, 248 pages.
3GPP TS 22.179 v13.0.1: "Mission Critical Push to Talk (MCPTT) over LTE (Stage 1)," Mar. 21, 2015, 76 pages.
3GPP TS 23.468 v12.3.0: "Group Communication System Enablers for LTE (GCSE_LTE); Stage 2," Dec. 2014, 26 pages.
Camarillo et al., "The Binary Floor Control Protocol (BFCP)," IETF RFC 4582, Nov. 2006, 65 pages.
Hautakorpi and Camarillo, "The Session Initiation Protocol (SIP) P-Refused-URI-List Private-Header (P-Header)," IETF RFC 5318, Dec. 2008, 12 pages.
OMA-AD-PCPS-V1_0: "Push to Communicate for Public Safety Architecture," Feb. 20, 2015, 65 pages.

(Continued)

*Primary Examiner* — Fayyaz Alam
(74) *Attorney, Agent, or Firm* — Fish & Richardson P.C.

(57) ABSTRACT

A method for merging active group calls includes receiving, at a first Push to Talk (PTT) server, a request to merge a first and a second active group call. A first and a second group of PTT clients participate in the first and the second active group call, respectively. The first PTT server may send a first invite message to a first group PTT server which hosts the first group call. In response to the first invite message, the first PTT server may receive a first response message. The first PTT server may send a second invite message to a second group PTT server which hosts the second group call. In response to the second invite message, the first PTT server may receive a second response message. The first PTT server may host a merged PTT group call which includes the first and the second group of PTT clients.

20 Claims, 7 Drawing Sheets

(56) References Cited

OTHER PUBLICATIONS

OMA-AD-PoC-V1_0: "Push to talk over Cellular (PoC)—Architecture," Aug. 5, 2005, 167 pages.
OMA-AD-PoC-V2_0: "Push to talk over Cellular (PoC)—Architecture," Aug. 2, 2011, 50 pages.
OMA-AD-PoC-V2_1: "Push to talk over Cellular (PoC)—Architecture," Aug. 2, 2011, 67 pages.
OMA-TS-PoC_System_Description-V2_0: "OMA PoC System Description," Aug. 6, 2008, 23 pages.
OMA-TS-PoC_System_Description-V2_1: "OMA PoC System Description," Aug. 2, 2008, 67 pages.
OMA-TS-PoC_User_Plane-V2_1: "PoC User Plane," Dec. 22, 2009, 379 pages.
Rosenberg et al., "SIP: Session Initiation Protocol," IETF RFC 3261, Jun. 2002, 252 pages.
Schulzrinne et al., "TRP: A Transport Protocol for Real-Time Applications," IETF RFC 3550, Jul. 2003, 89 pages.
International Search Report and Written Opinion of the International Searching Authority issued in International Application No. PCT/US2016/039852 on Oct. 5, 2016; 12 pages.

* cited by examiner

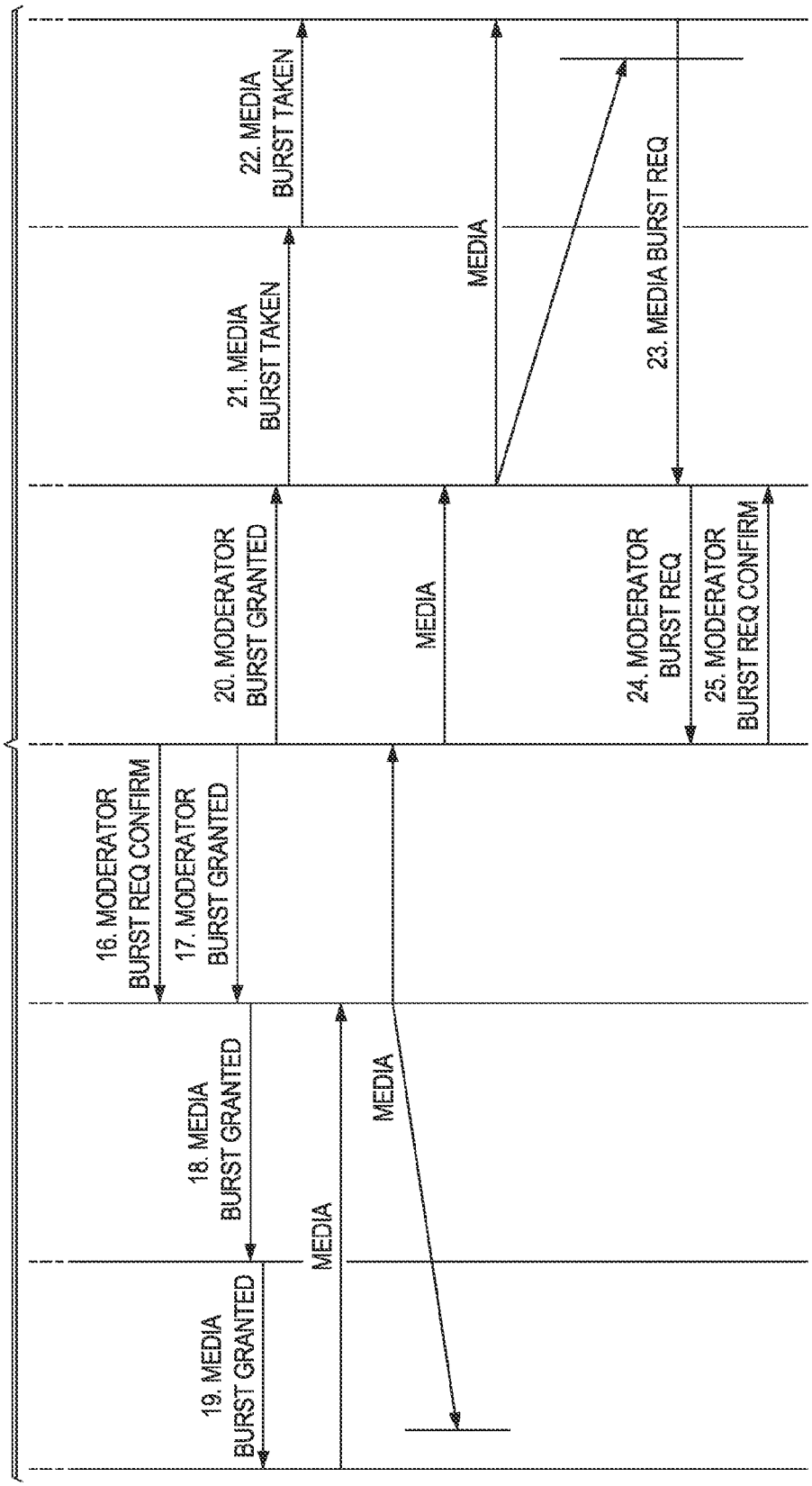

MERGING ACTIVE GROUP CALLS

TECHNICAL FIELD

This disclosure relates to data transmission in wireless communication systems and, more specifically, to merging active group calls.

BACKGROUND

In some cases, a Push to Talk (PTT) service may provide an arbitrated service for two or more users that engage in a communication. For example, a user in a group call may request permission to transmit media, e.g., voice, video, or other multi-media contents. In some cases, the user may request the permission by pressing a button on a device, which sends a request to a server. The server may determine whether to grant the user permission to transmit and send a grant message to the user. Examples of PTT service may include the Mission Critical PTT (MCPTT) service that may be suitable for mission critical scenarios. In some cases, the MCPTT service may use The Third Generation Partnership Project (3GPP) transport communication mechanisms provided by the Evolved Packet System (EPS) architectures to establish, maintain, and terminate the actual communication paths among the users. In some cases, the MCPTT service may use non-3GPP access technologies and architectures (e.g., based on a dispatcher and/or administrator interface). Examples of PTT service may also include non-mission critical PTT services.

DESCRIPTION OF DRAWINGS

FIGS. 6A and 6B are data flow diagrams illustrating an example process for merging active group calls according to an implementation.

Like reference numbers and designations in the various drawings indicate like elements.

DETAILED DESCRIPTION

Figure 1:
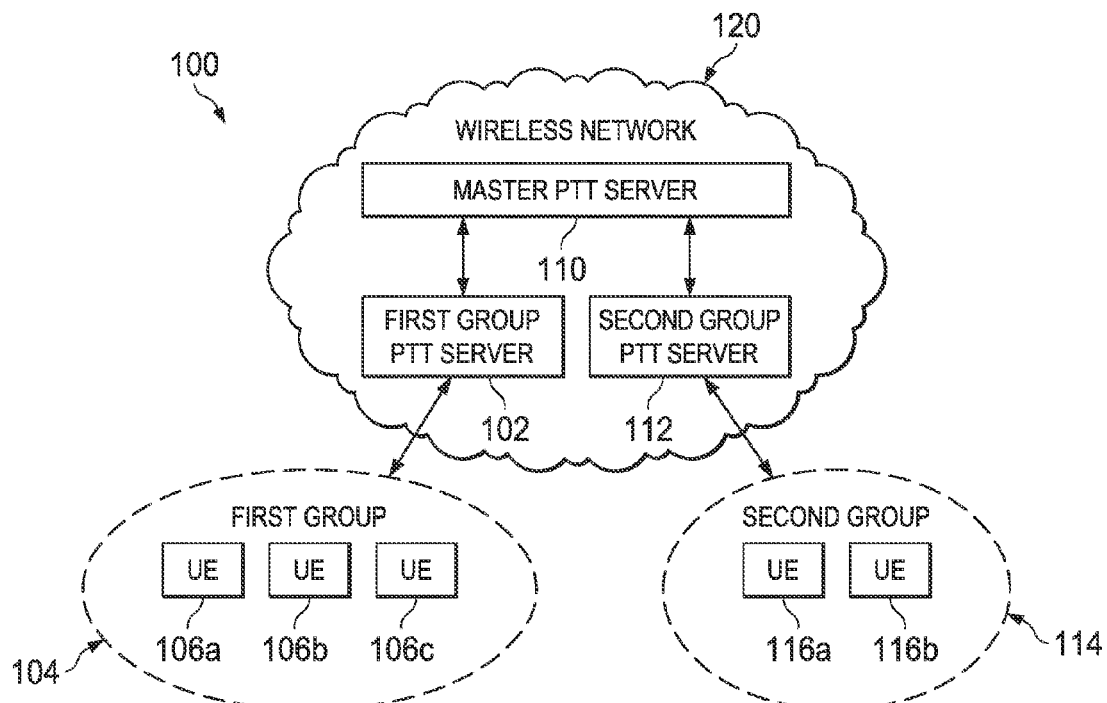
FIG. 1 is an example wireless communication system that merges active group calls according to an implementation.

The present disclosure is directed to merging active group calls. In some cases, multiple PTT groups may be temporarily merged. For example, when an incident occurs in an area, different PTT groups may be merged so that members in these different PTT groups can communicate with one another. In some cases, an ad hoc group or a pre-arranged group may be formed to include different PTT groups. An ad hoc group call is one where the members of the group are included in the request that initiates the call. A pre-arranged group is one where a group list of members is pre-defined and the call is initiated by including the URI associated with the group in the request that initiates the call. The users in these different PTT groups may be invited to join the ad hoc group call or the pre-arranged group call. After the incident, the ad hoc group call or the pre-arranged group call may be ended.

In some cases, two or more PTT groups have active group calls and would like to merge their active group calls in a merged group call. Using an ad hoc group call or a pre-arranged group call for a merged call may lose the status of the active group calls. For example, the ad hoc group call or the pre-arranged group call approach may invite all the members of the PTT groups, including the members who are not participating in the current active group calls. In addition, the information of the active group calls, e.g., the queue information and pending requests, may be lost in the ad hoc group call or the pre-arranged group call.

In some cases a type of group known as a chat group may be used for PTT calls. In an ad hoc group or pre-arranged group the members are invited to join the group call at the start of the call. In a chat group, however, the group members have to request to join (in a similar way as in a dial in conference).

In some cases of pre-arranged and chat groups, in addition to having a list of authorized members to be invited or allowed to join the group call, the authorized members may have to affiliate to the group to indicate a current interest to be invited to a group call. The active participants in a group call may be a subset of those affiliated to the group since some affiliated members may not be able to participate in the call (e.g., due to being out of radio coverage or the user not accepting the invitation to join).

In some cases, multiple chat groups or pre-arranged groups may need to be merged, and authorized members from other groups may attempt to join the merged chat group call (e.g. by sending an invite to the PTT server to join the merged chat group call hosted by the server). However, the hosting server of the chat group call may not have access to group information, e.g., the member list, of other PTT groups that host their active group calls in a different server. Therefore, the hosting server may not be able to invite or authorize the members from the other PTT groups to join the chat group call. Additionally, authorized members of a chat group may not be aware that the chat group has been merged into a temporary chat group call. Therefore, a method and/or system is needed to either indicate to all authorized members that the chat group has been merged into a temporary chat group call or to redirect and/or notify members attempting to join the original chat group that they may now need to join the merged temporary chat group call.

FIG. 1 is an example wireless communication system 100 that merges active group calls according to an implementation. For example, a first group of PTT clients may already be participating in the first active group call and a second group of PTT clients may already be participating in the second active group call. A master Push to Talk (PTT) server (also known as a first PTT server) may receive a request to merge a first active group call and a second active group call. The master PTT server may send a first invite message to a first group PTT server. The first group PTT server may host the first active group call. In response to the first invite message, the master PTT server may receive a first response message from the first group PTT server. The master PTT server may send a second invite message to a second group PTT server. The second group PTT server may host the second active group call. In response to the second invite message, the master PTT server may receive a second response message from the second group PTT server. The master PTT server may host a merged PTT group call. The first group of PTT clients and the second group of PTT clients may participate in the merged PTT group.

In some implementations, the master PTT server may receive a moderator media burst request message from the first group PTT server. The moderator media burst request message may indicate a pending request to send media. The pending request may be received at the first group PTT server prior to the receiving of the request to merge the first and the second active group calls. The master PTT server may send a moderator media burst grant message. The moderator media burst grant message may grant the pending request. In some cases, the moderator media burst request message may indicate a Multimedia Broadcast/Multicast Service (MBMS) bearer that is used by at least one PTT client of the first group of PTT clients for the first active group call. In some cases, the moderator media burst request message may indicate a timestamp, a queue position, or a priority of the pending request.

In some implementations, the master PTT server may send a first subscribe request to the first group PTT server. In response to the first subscribe request, the master PTT server may receive a first notify message. The first notify message may identify the first group of PTT clients. In some implementations the first notify message may include metadata of the first group of PTT clients. In some cases, the metadata may indicate one or more pending requests to send media from members of the first group of PTT clients. The pending request(s) may be received at the first PTT server prior to the first invite message. In some cases, the metadata may indicate at least one of a timestamp, a queue position, or a priority of each of the pending requests. In some cases, the metadata may indicate a Multimedia Broadcast/Multicast Service (MBMS) bearer that is used by at least one PTT client of the first group of PTT clients for the first active group call. In some cases the first notify message may identify the authorized members of the group, affiliated members of the group or the participants of the group call.

The master PTT server may send a second subscribe request to the second group PTT server. In response to the second subscribe request, the master PTT server may receive a second notify message. The second notify message may identify the second group of PTT clients. In some cases, the master PTT server may receive a subscribe request from the first group PTT server. In response to the subscribe request, the master PTT server may send a first notify message. The first notify message may identify the second group of PTT clients. In some cases, the master PTT server may send a second notify message. The second notify message may identify that a PTT client has joined or left the merged group call.

In some implementations the second notify message may include metadata of the second group of PTT clients. In some cases, the metadata may indicate one or more pending requests to send media from members of the second group of PTT clients. The pending request(s) may be received at the second PTT server prior to the second invite message. In some cases, the metadata may indicate at least one of a timestamp, a queue position, or a priority of each of the pending requests. In some cases, the metadata may indicate a Multimedia Broadcast/Multicast Service (MBMS) bearer that is used by at least one PTT client of the second group of PTT clients for the second active group call. In some cases the second notify message may identify the authorized members of the group, affiliated members of the group or the participants of the group call.

In some implementations, the master PTT server may be a different server than the first group PTT server or the second group PTT server. In some implementations, the master PTT server may be the same server as the first group PTT server or the second group PTT server.

Merging active group calls according to methods and systems described herein may provide one or more advantages. For example, the queued request from the request queues of the first group call and the second group call are transferred to the master PTT server. The request queue may include the request from the PTT clients that are requesting permission to send media. The master PTT server may obtain the information of the pending requests received prior to the formation of the merged group call by the first group call and the second group call. The master PTT server may process these pending requests in the merged group call. The merged group call may include the PTT clients that are currently participating in the first group call and the second group call without including the PTT clients that are not currently participating in the first and second group calls. In some cases the authorized members of a group might be very large but the actual affiliated members and active participants in the call may be much smaller so it is an advantage that there is no disruption of the ongoing group call when regrouping takes place. In addition, the master PTT server may also obtain the information of the pending requests in the first and second group calls and may process these pending requests in the merged call and consolidate the pending requests from the first group call with the pending request from the second group call according to the timestamps, relative queue positions or and priorities of the requesting participants from both group calls. Furthermore, using an MBMS channel to send media data from the master PTT server to the PTT clients in the merged group call may save resources and improve efficiency of the communication system.

At a high level, the example wireless communication system 100 includes a wireless communication network 120, which includes or is communicably coupled with a first group PTT server 102, a second group PTT server 112, and a master PTT server 110. The example wireless communication system 100 also includes User Equipments (UEs) 106a-c and UEs 116a-b. In some cases, each of the UEs 106a-c and UEs 116a-b may include a PTT client. The wireless communication system 100 may also include UEs that are non-wireless devices such as a PTT Dispatch Console that may be connected to the wireless network using a fixed access technology such as Ethernet or a wireless local area network (WLAN). A PTT client may represent an application, set of applications, software, software modules, hardware, or combination thereof that can be configured to communicate with a PTT server for PTT services. As illustrated, the UEs 106a-c are included in the first group 104 and the UEs 116a-b are included in the second group 114. In some cases, the first group 104 has a first ongoing group call that is participated in by the UEs 106a-c, and the second group 114 has a second ongoing group call that is participated in by the UEs 116a-b.

The example wireless communication system 100 also includes a first group PTT server 102 that hosts the first group call, a second group PTT server 112 that hosts the second group call, and a master PTT server 110 that performs the floor control arbitration for the merged group call. In some cases, a PTT server, e.g., the first group PTT server 102, the second group PTT server 112, or the master PTT server 110 may provide a participating function, controlling function, terminating function, or a combination thereof for PTT service.

In some cases, a PTT server may provide a participating function for an associated PTT client. In these or other cases, the PTT server may be in the same service domain as the associated PTT client. Example of a service domain may be a network or a portion of a network. For example, the PTT server may be an application server in the home core network of a PTT client. The PTT server may have access to the associated PTT client's configurations and settings. The PTT server may also perform a media replication function, a traffic optimization function, or a combination thereof for the associated PTT client.

In some cases, a PTT server may provide a controlling function for a group call. In these or other cases, the PTT server may act as the host of the group call. The PTT server may perform the Floor control arbitration function, e.g., the media burst control or floor control function, to receive and arbitrate requests to send media in a group call. The PTT server may also perform a media replication function, a traffic optimization function, or a combination thereof for the group call.

In some cases, the PTT servers that perform the participating function and the controlling function may be collocated in the same entity. For example, the first group PTT server 102 may perform both the participating function and the controlling function. Alternatively, the PTT servers that perform the participating function and the controlling function may be located separately in the network architecture. In some cases, as illustrated, the first group PTT server 102, the second group PTT server 112, and the master PTT server 110 may be located in the same wireless network. Alternatively, the first group PTT server 102, the second group PTT server 112, and the master PTT server 110 may be located in different wireless networks.

In some cases, the PTT servers and the PTT clients may be implemented in accordance with the PTT over Cellular (PoC) or Push to Communicate for Public Safety (PCPS) standard. The PoC and PCPS standards were developed by Open Mobile Alliance (OMA) to provide PTT service over Internet Protocol (IP) based cellular networks. In some cases the PTT servers and the PTT clients may be implemented in accordance with the Mission Critical PTT (MCPTT) standard under development by 3GPP.

In operation, the master PTT server 110 receives a request to merge the UEs in the first group 104 and the UEs in the second group 114. The request may include an identifier for the first group 104 and an identifier for the second group 114. The master PTT server 110 sends a first invite message to the first group PTT server 102. The first invite message may include an indication that if the first group is involved in an active call then the master PTT server 110 requests to act as the master PTT server for the call and that it should be sent requests for the floor and will control which PTT clients of the first group are granted the floor. In some cases, the indication may be encoded using Extensible Markup Language (XML). Alternatively or in combination, the indication may be encoded in one or more existing or new header fields in the invite message. In response to the first invite message, the master PTT server 110 receives a first response message. The first response message may indicate that the first group 104 has an active group call. In some cases, the indication that the group is currently in an active group call may be encoded using Extensible Markup Language (XML). Alternatively or in combination, the indication may be encoded in one or more existing or new header fields in the response message. The first response message may indicate that the first group PTT server 102 accepts the request of the master PTT server 110 to be the master PTT server for the call. In some cases, the indication the first group PTT server 102 accepts the request of the master PTT server 110 to be the master PTT server for the call may be encoded using Extensible Markup Language (XML). Alternatively or in combination, the indication may be encoded in one or more existing or new header fields in the response message. The master PTT server 110 sends a second invite message to the second group PTT server 112. The second invite message may include an indication that if the second group is involved in an active call then the master PTT server 110 requests to act as the master PTT server for the call and that it should be sent requests for the floor and will control which PTT clients of the second group are granted the floor. In some cases, the indication may be encoded using Extensible Markup Language (XML). Alternatively or in combination, the indication may be encoded in one or more existing or new header fields in the invite message. In response to the second invite message, the master PTT server 110 receives a second response message. The second response message may indicate that the second group 114 has an active group call. The second response message may indicate that the second group PTT server 112 accepts the request of the master PTT server 110 to be the master PTT server for the call. In some cases, the indication that the group is currently in an active group call may be encoded using Extensible Markup Language (XML). Alternatively or in combination, the indication may be encoded in one or more existing or new header fields in the response message. The master PTT server 110 may perform the floor control arbitration function for a merged PTT group call that may be participated in by the UEs 106*a-c* and the UEs 116*a-b*. The first group PTT server 102 and the second group PTT server 112 may send the pending requests of the first group 104 and the second group 114 to the master PTT server 110. The master PTT server 110 processes floor control requests for the merged group call and determines which PTT client in either the first group or the second group is granted the floor next.

In some implementations, the master PTT server 110 may create a request queue for the merged group call. In some cases, if the master PTT server 110 is the same server as the first group PTT server 102 or the second group PTT server 112, the existing request queue of the first group 104 or the existing request queue of the second group 114 may be updated or replaced to become the request queue of the merged group call.

In some implementations, the master PTT server 110 may contact the first group PTT server 102 and the second group PTT server 112 to inform that the PTT server 110 is the master PTT server. The first group PTT server 102 and the second group PTT server 112 may then send the media and request queue information to the master PTT server 110. The group PTT server 102 or 112 may also send the information of the PTT clients in the group to the master PTT server 110, for example, the roles, priorities, and privileges of the PTT clients. In some public safety use cases, the role, priority, or privilege of a PTT client may depend on the type of incident the PTT client is serving or the PTT client's overall shift role. The group PTT server may also send the information whether a PTT client is currently participating in the group call to the master PTT server 110. The master PTT server 110 makes the decision and indicates to the first group PTT server 102 and the second PTT group server 112 the PTT client that is granted permission to send media.

In some implementations, a PTT client may like to have information of other PTT clients in the merged group call. To achieve this, the master PTT server 110 sends a subscribe request to the group PTT server 102 and 112. The group PTT server 102 or 112 may provide this information to the master PTT server 110 in notify messages. The master PTT server 110 may provide the group PTT server 102 or 112 with information of the PTT clients in other groups. The group PTT server 102 or 112 may provide this information to its hosted PTT clients when requested by the PTT clients. This is achieved by PTT server 102 and 112 sending a subscribe request to the master PTT server 110 and the master PTT server 110 providing this information to the master PTT server 110 in notify messages. In some implementations, the PTT client may send the request for information of other PTT clients in the merged group call directly to the master PTT server 110. The PTT client may obtain information of the other PTT clients in the merged call from the master PTT server 110. In some implementations the master PTT server 110 may indicate to a PTT client that it can request the information of other PTT clients in the merged group call directly from the master PTT server 110.

FIG. 2-9 and associated descriptions provide additional details for example implementations.

Turning to a general description of the elements, a UE may be referred to as a mobile electronic device, user device, mobile station, subscriber station, portable electronic device, mobile communications device, wireless modem, PTT dispatch console or wireless terminal. Examples of a UE (e.g., the UEs 106*a-c* and the UEs 116*a-b*) may include a cellular phone, personal data assistant (PDA), smart phone, PTT dispatch console, laptop, tablet personal computer (PC), pager, portable computer, portable gaming device, wearable electronic device, or other mobile communications device having components for communicating voice or data via a wireless communication network. The wireless communication network may include a wireless link over at least one of a licensed spectrum and an unlicensed spectrum.

Other examples of a UE include mobile and fixed electronic devices. A UE may include a Mobile Equipment (ME) device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. The term "UE" can also refer to any hardware or software component that can terminate a communication session for a user. In addition, the terms "user equipment," "UE," "user equipment device," "user agent," "UA," "user device," and "mobile device" can be used synonymously herein.

The wireless communication network 120 may include one or a plurality of radio access networks (RANs), other access networks such as fixed Ethernet or IEEE 802.11 WLAN, core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evaluation (LTE), or LTE-Advanced. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station.

A base station may be a radio base station that may control all or at least some radio-related functions in a fixed part of the system. The base station may provide radio interface within their coverage area or a cell for a UE to communicate. The base station may be distributed throughout the cellular network to provide a wide area of coverage. The base station directly communicates with one or a plurality of UEs, other base stations, and one or more core network nodes.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate.

Figure 2:
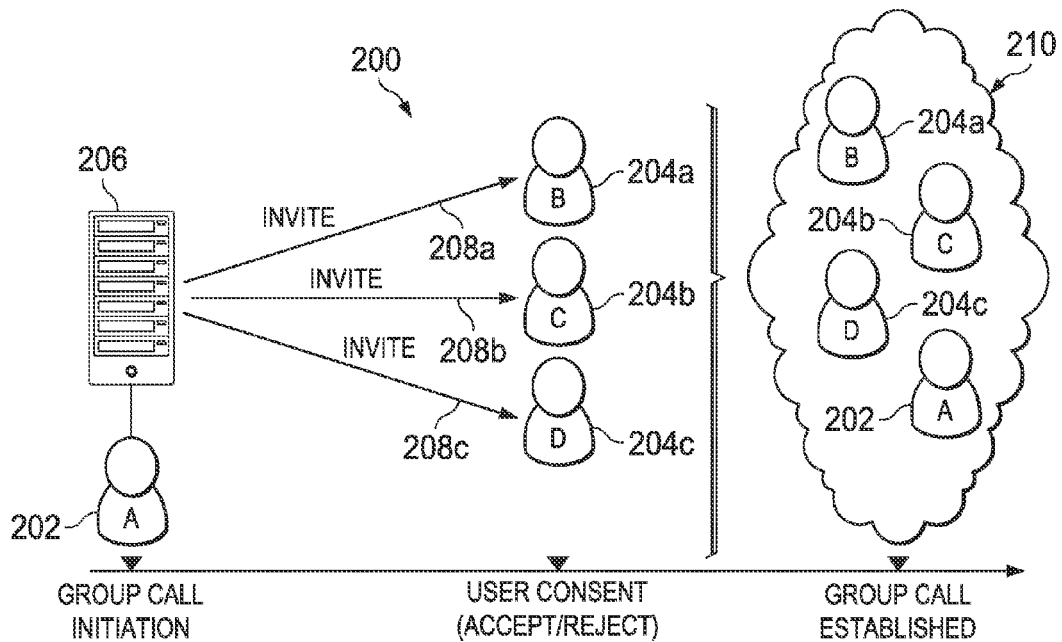
FIG. 2 illustrates an example ad hoc PTT group call.

FIG. 2 illustrates an example ad hoc PTT group call. The system 200 for an ad hoc PTT group call may involve a PTT client 202 that acts as a group call initiator, a number of PTT clients 204*a-c* that will participate in the group call, and a PTT server 206. The group call initiator 202 may send an invite message to the PTT server 206 to initiate the group call. The invite message may include a list of PTT clients that will be invited to the group call. The PTT server 206 then sends invite requests 208*a-c* to the PTT clients 204*a-c* to form a group call 210.

Figure 3:
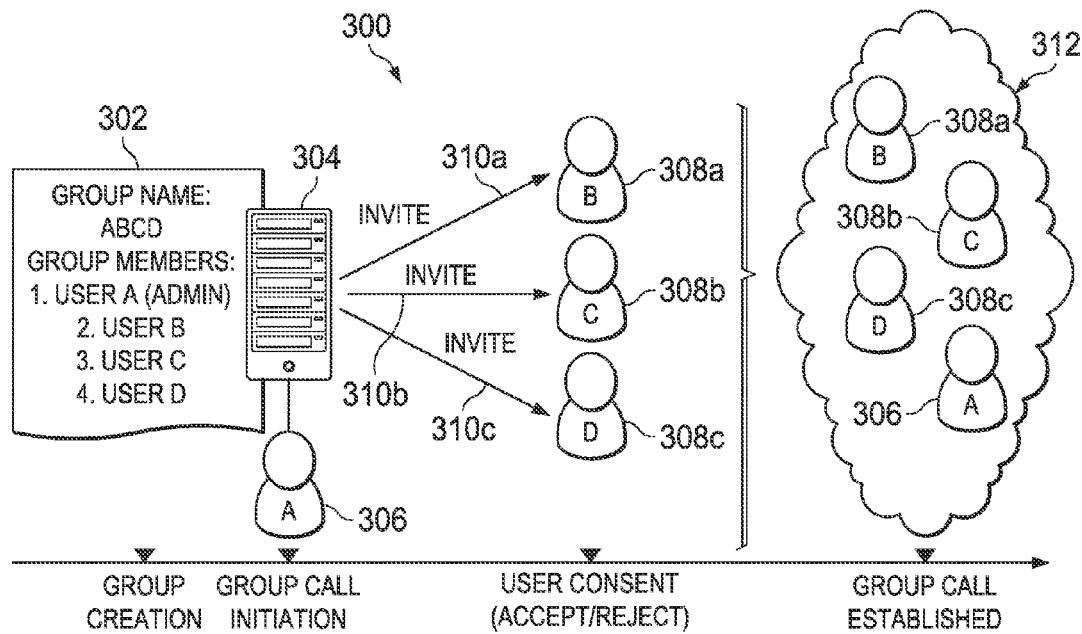
FIG. 3 illustrates an example pre-arranged PTT group call.

FIG. 3 illustrates an example pre-arranged PTT group call. The system 300 for a pre-arranged PTT group call may involve a PTT server 304, a PTT client 306 that acts as a group call initiator, and a number of PTT clients 308*a-c* that will participate in the group call. A list of PTT clients 302 of the pre-arranged group is pre-provisioned in the PTT server 304. The group call initiator 306 may send an invite message to the Uniform Resource Indicator (URI) for the group. The PTT server 304 that hosts the group then sends invite message to the PTT clients 308*a-c* in the pre-arranged group to form a group call 312.

Figure 4:
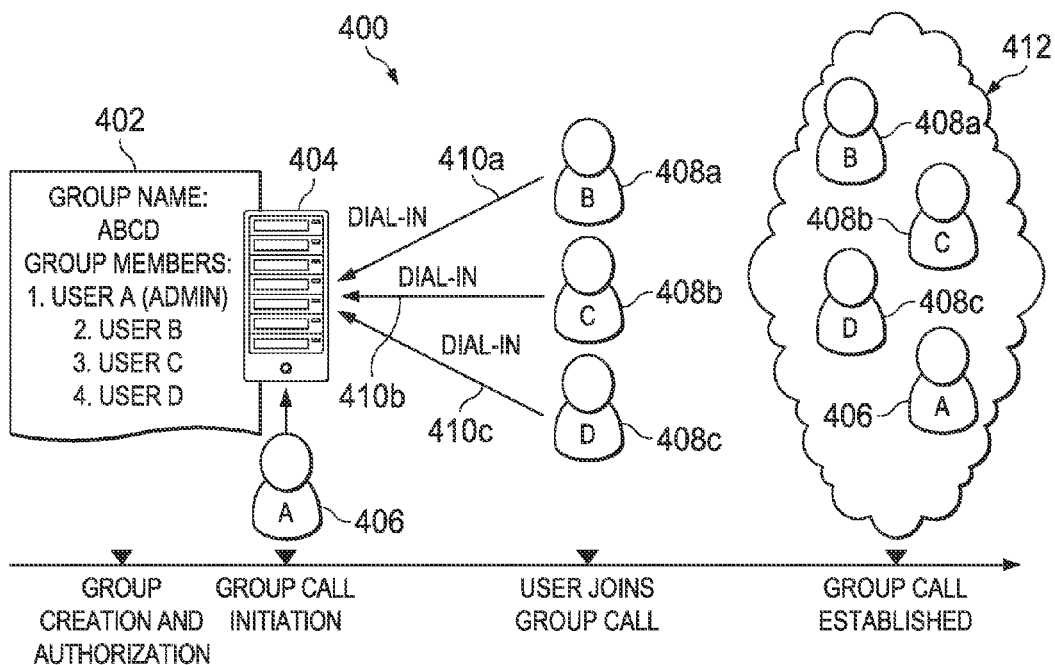
FIG. 4 illustrates an example chat PTT group call.

FIG. 4 illustrates an example chat PTT group call. The system 400 for a chat PTT group call may involves a PTT server 404, a PTT client 406 that acts as a group call initiator, and a number of PTT clients 408*a-c* that will participate in the group call. In a restricted chat PTT group call, a list of PTT clients 402 is pre-provisioned in the PTT server 404. The PTT clients that would like to join the group call send invite messages or dial-in messages 410*a-c* to the URI for the group to form a group call 412. In a restricted chat PTT group call, the PTT server 404 that hosts the group checks whether the requesting PTT client is in the pre-provisioned list. In the unrestricted chat PTT group call there is no pre-provisioned list and any PTT client can join. These long-lived semi-permanent chat group calls are likely to be a common type of group call used by public safety agencies.

Figure 5:
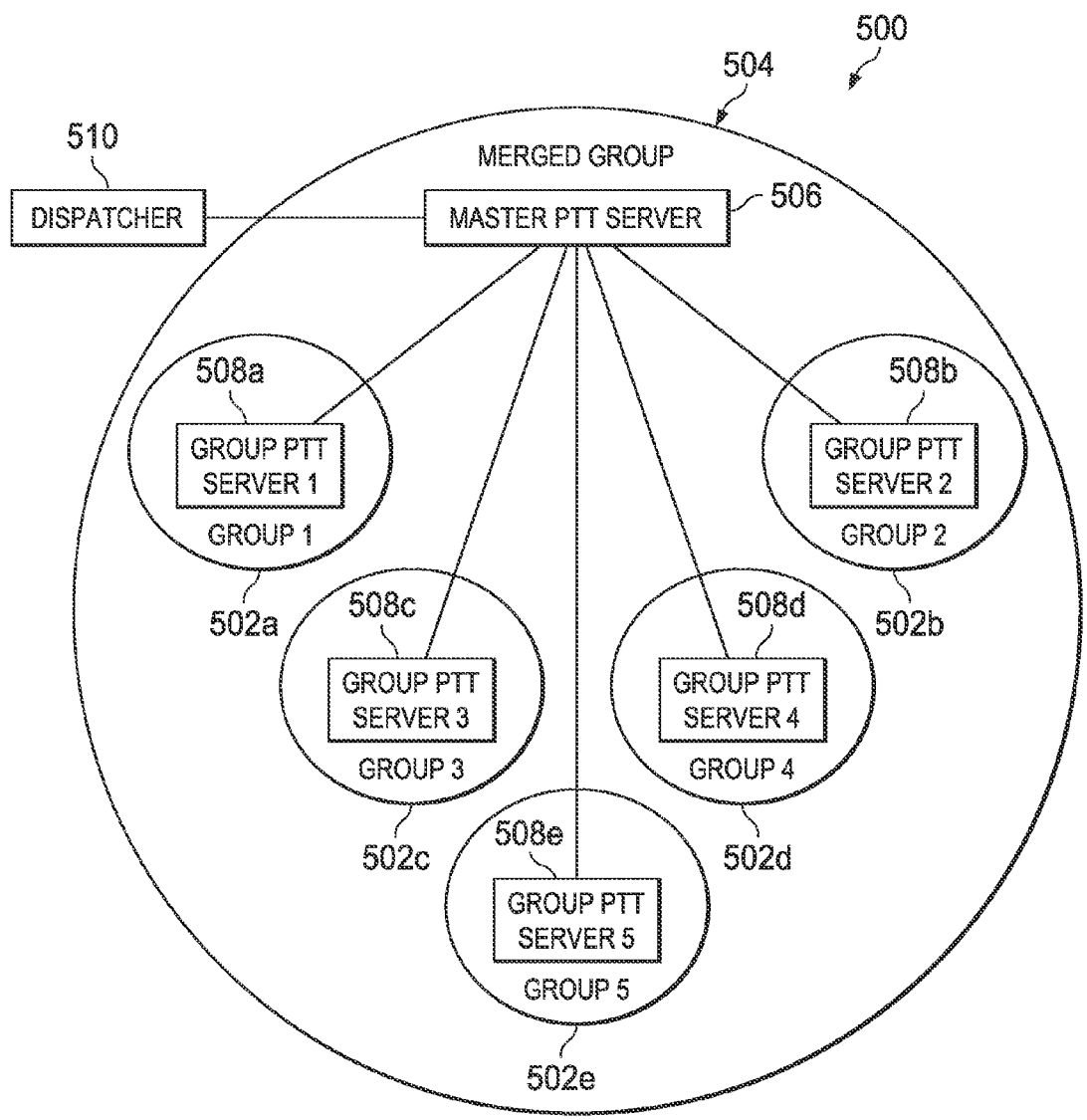
FIG. 5 is an example communication system for merging active group calls according to an implementation.

FIG. 5 is an example communication system for merging active group calls according to an implementation. The system 500 includes a master PTT server 506, a number of group PTT servers 508*a-e* hosting group calls 502*a-e*, and a PTT client 510 that acts as a dispatcher. The dispatcher 510 may send a request to the master PTT server 506 to merge the group calls 502*a-e* into a merged group call 504. The master PTT server 506 may send a request to the group PTT servers 508*a-e*. The group PTT servers 508*a-e* may transfer the floor request queues to the master PTT server 506. The group PTT servers 508*a-e* may transfer subsequent floor requests to the master PTT server 506. The master PTT server 506 may create a floor request queue for the merged group call 504 and grant requests to send media. The grant request to send media may be sent to the group PTT servers 508a-e.

In some implementations, a new PTT server is assigned as the master PTT server 506 for the merged group call and the PTT servers of group calls 502a-e act as group PTT servers 508a-e. In some cases, one of the PTT servers of group calls 502a-e is assigned as the master PTT server 506. The moderated PTT group call mechanisms defined in OMA-TS-PoC_System_Description-V2_1 could be enhance to be used to allow the master PTT server 506 to act as the moderator and the group PTT servers 508a-e would act similarly to the PTT server in a moderated PTT call (see OMA-TS-PoC_System_Description-V2_1). The moderated media burst control messages could be enhanced to be used to allow the master PTT server 506 to receive requests to send media and to grant the request to the PTT clients in the merged group call.

In some implementations, the merged group call can be demerged. For example, the dispatcher 510 may send a request to the master PTT server 506 indicating that the merged groups are to be demerged. The master PTT server 506 may send a request to each of the group PTT servers 508a-e indicating that the merged group call is to be demerged. The master PTT server 506 may provide the group PTT servers 508a-e with the request queue associated with each of the groups. The master PTT server 506 may send a Bye request to each of the group PTT servers 508a-e indicating that the master PTT server 506 is leaving the call.

Figure 6A:
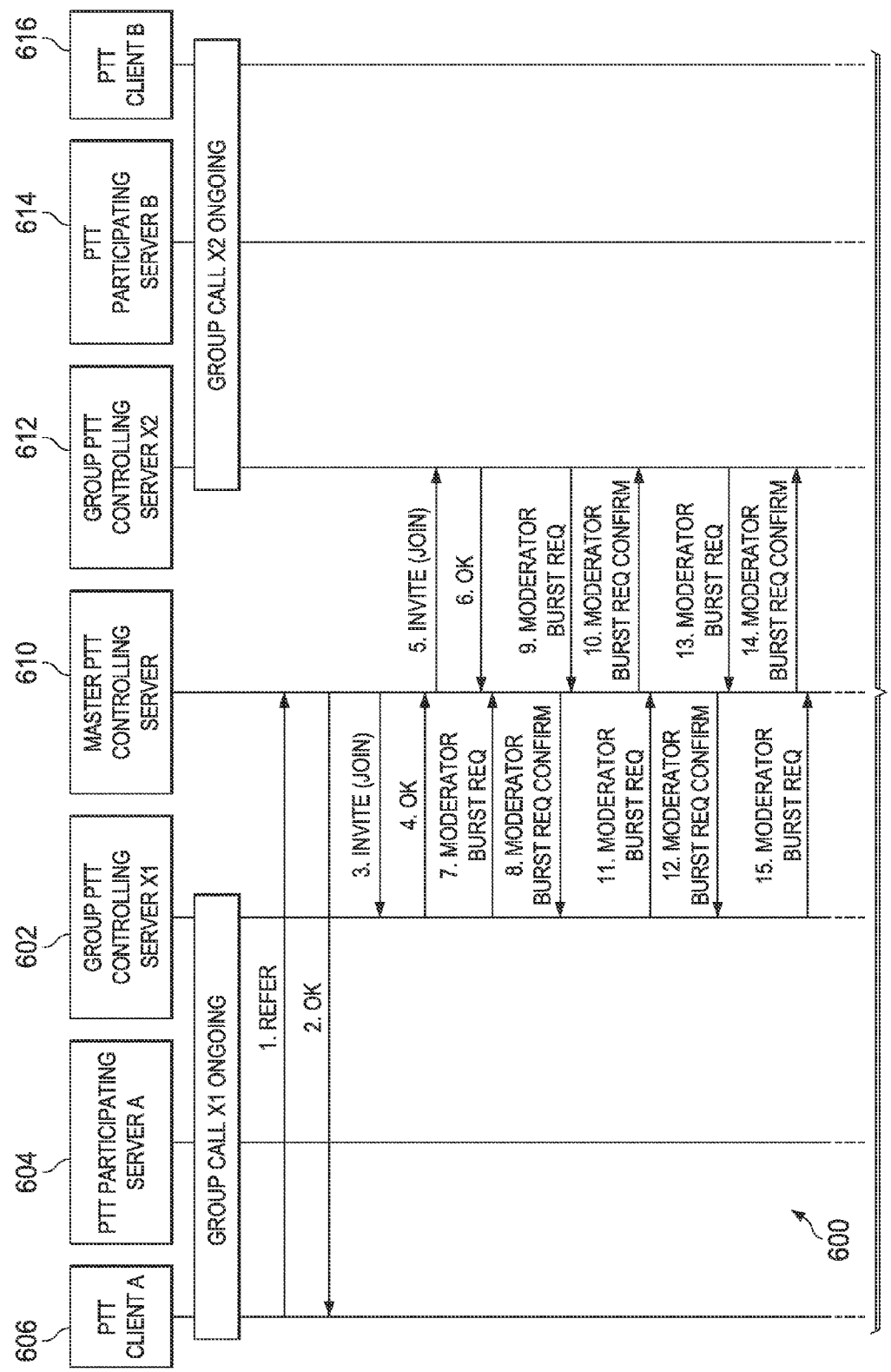

FIGS. 6A and 6B are data flow diagrams illustrating an example process 600 for merging active group calls according to an implementation. The data flow diagram includes a group PTT controlling server X1 602. The group PTT controlling server X1 602 represents an application, set of applications, software, software modules, hardware, or combination thereof that can be configured to provide a controlling function for an active group call, e.g., the active group call X1 as illustrated in FIGS. 6A and 6B. In some cases, a group of PTT clients, e.g., the group X1, may participate in the active group call X1. For example, as illustrated, the group X1 may include a PTT client A 606. The data flow diagram also includes a PTT participating server A 604. The PTT participating server A 604 represents an application, set of applications, software, software modules, hardware, or combination thereof that can be configured to provide a participating function for the PTT client A 606. In some cases, the group PTT controlling server X1 602 and the PTT participating server A 604 may be implemented on the same PTT server. In these or other cases, the messages between the group PTT controlling server X1 602 and the PTT participating server A 604 shown in the data flow diagram may be omitted.

The data flow diagram also includes a group PTT controlling server X2 612 that provides a controlling function for an active group call X2. In some cases, another group of PTT clients, e.g., the group X2, may participate in the active group call X2. For example, as illustrated, the group X2 may include a PTT client B 616. The data flow diagram also includes a PTT participating server B 614 that provides a participating function for the PTT client B 616. In some cases, the group PTT controlling server X2 612 and the PTT participating server B 614 may be implemented on the same PTT server. In these or other cases, the messages between the group PTT controlling server X2 612 and the PTT participating server B 614 shown in the data flow diagram may be omitted.

The data flow diagram also includes a master PTT controlling server 610 that provides a controlling function for the merged group call of the active group call X1 and the active group call X2. In some cases, the master PTT controlling server 610 is a different server than the group PTT controlling server X1 602 or the group PTT controlling server X2 612. In some cases, the master PTT controlling server 610 is the same server as the group PTT controlling server X1 602 or the group PTT controlling server X2 612. In these or other cases, the messages between the group PTT controlling server X1 602 and the master PTT controlling server 610 or the messages between the group PTT controlling server X2 612 and the master PTT controlling server 610 shown in the data flow diagram may be omitted.

As shown in FIGS. 6A and 6B, before operation 1, both the active group calls X1 and X2 are ongoing. At operation 1, the PTT client A 606 sends a request to the master PTT controlling server 610 to request the merge of the active group call X1 and the active group call X2. In some cases, the request may be a Refer request. The request may request the master PTT controlling server 610 to send an invite message to each of the group PTT controlling server X1 602 and the group PTT controlling server X2 612 with a join indication indicating that it is requesting to join the call and requesting to act as the master floor control arbitrator for the merged group call. In some cases, the request may include an identifier for the group X1 and an identifier for the group X2. Examples of the identifier may include a Uniform Resource Indicator (URI) or any other group identity indicators. In some cases, the URI may be a string of characters used to identify the group. In some cases, the identifier may be included in a Refer-To header field of a Refer request. In some cases, the request may be sent by an authorized PTT client in the group X1 or the group X2, e.g., the PTT client A 606 as illustrated. Alternatively or in combination, the request may be sent by a dispatcher that is neither in the group X1 nor in the group X2. Alternatively or in combination, the request at operation 1 may be sent by a Group Management Server based upon creation of merged group of X1 and X2 in the Group Management Server in order to merge the group calls of X1 and X2.

At operation 2, the master PTT controlling server 610 sends an OK response to the PTT client A 606. In some cases, the OK response indicates that the master PTT controlling server 610 has received the request.

At operation 3, the master PTT controlling server 610 sends an invite message to the group PTT controlling server X1 602. The invite message may include a join indication indicating that it is requesting to join the call and requesting to act as the master floor control arbitrator for the merged group call. The invite message may also include the identifier of the group X1. The identifier of the group X1 may be included in a Request-URI field of the invite message. In some case, the invite message may indicate that the sending PTT server will be the master PTT controlling server and the receiving PTT server will be the group PTT controlling server. The master PTT controlling server may also provide an address (e.g., an IP address) for the group PTT controlling server to forward media and requests to send media. In responding to the invite message, at operation 4, the group PTT controlling server X1 602 sends an OK response to the master PTT controlling server 610. The OK response may contain an indication that PTT controlling server X2 612 accepts the request of the master PTT controlling server 610 to perform the floor control arbitration for the merged group call.

At operation 5, the master PTT controlling server 610 sends an invite message to the group PTT controlling server X2 612. The invite message may include a join indication. The invite message may also include the identifier of the group X2. The identifier of the group X2 may be included in a Request-URI field of the invite message. In responding to the invite message, at operation 6, the group PTT controlling server X2 612 sends an OK response to the master PTT controlling server 610. The OK response may contain an indication that PTT controlling server X2 612 accepts the request of the master PTT controlling server 610 to perform the floor control arbitration for the merged group call.

At operation 7, the group PTT controlling server X1 602 sends a moderator burst request to the master PTT controlling server 610. The moderator burst request is used by the group PTT controlling server X1 602 to send an indication of a pending request to send media to the master PTT controlling server 610. In some implementations, the moderator burst request may include information of a pending request that was received at the group PTT controlling server X1 602 prior to receiving the invite message to merge the group calls. The moderator burst request may include an indication of the identity of the PTT Client that sent the pending request. The moderator burst request may also include the information of the pending request. Information of a pending request may include the timestamp of the request, the priority of the request, and a queue position of the request. The timestamp may indicate the time when the pending request is received. The priority may indicate the priority of the request which may depend on the role and priority of the PTT client that sent the request or the nature of the request (e.g. an emergency). The queue position may indicate the position of the pending request in the request queue. The group PTT controlling server X1 602 may maintain a request queue for the pending requests from the PTT clients in the group X1. The group PTT controlling server X1 602 may also maintain multiple request queues for the requests. In some cases, one moderator burst request message may include information of multiple pending requests.

In some implementations, the moderator burst request may also include an identification of the MBMS bearer used by the PTT client that sent the pending request to receive media. The identification of the MBMS bearer may include a Temporary Multicast Group Identity (TMGI). By providing the MBMS bearer information, the master PTT controlling server 610 may send the media directly to the PTT client without routing through the group PTT controlling server X1 602. In some cases, the master PTT controlling server may establish a new MBMS bearer with a new key or a new TMGI and send an indication to the PTT clients in the merged group to move media transmission to the newly established MBMS bearer. Alternatively the master PTT controlling server may utilize the existing MBMS bearers to deliver media to the merged group.

At operation 8, in responding to the moderator burst request, the master PTT controlling server 610 sends a moderator burst request confirm message to the group PTT controlling server X1 602 to acknowledge the receipt of the moderator burst request. In some cases, the moderator burst request confirm message may be sent using a Real-Time Control Protocol (RTCP) application (APP) packet. Alternatively or in combination, the media burst request message may be sent using Binary Floor Control Protocol (BFCP).

At operation 9, the group PTT controlling server X2 612 sends a moderator burst request to the master PTT controlling server 610. The moderator burst request is used by the group PTT controlling server X2 612 to send an indication of a pending request to send media to the master PTT controlling server 610. In some implementations, the moderator burst request includes information of a pending request that was received at the group PTT controlling server X2 612 prior to receiving the invite message to merge the group calls. The moderator burst request may include an indication of the identity of the PTT Client that sent the pending request. The moderator burst request may also include the information of the pending request such as the timestamp of the request, the priority of the request, a queue position of the request, and an identification of the MBMS bearer used by the PTT client that sent the pending request. At operation 10, in responding to the moderator burst request, the master PTT controlling server 610 sends a moderator burst request confirm message to the group PTT controlling server X2 612 to acknowledge the receipt of the moderator burst request.

At operation 11, the group PTT controlling server X1 602 may send a moderator burst request to the master PTT controlling server 610 to indicate a second pending request of the group X1 which was received at the group PTT controlling server X1 602 before the calls were merged. At operation 12, in responding to the moderator burst request, the master PTT controlling server 610 sends a moderator burst request confirm message to the group PTT controlling server X1 602.

At operation 13, the group PTT controlling server X2 612 may send a moderator burst request to the master PTT controlling server 610 to indicate a second pending request of the group X2 which was received at the group PTT controlling server X2 612 before the calls were merged. At operation 14, in responding to the moderator burst request, the master PTT controlling server 610 sends a moderator burst request confirm message to the group PTT controlling server X2 612.

At operation 15, the group PTT controlling server X1 602 may send a moderator burst request to the master PTT controlling server 610 to indicate a third pending request of the group X1 which was received at the group PTT controlling server X1 602 before the calls were merged. At operation 16, in responding to the moderator burst request, the master PTT controlling server 610 sends a moderator burst request confirm message to the group PTT controlling server X1 602.

In the example illustrated in FIGS. 6A and 6B, the group PTT controlling server X1 602 has three pending requests prior to receiving the invite message to merge the group calls and the group PTT controlling server X2 612 has two pending requests. Therefore, the group PTT controlling server X1 602 sends three moderator burst requests to transfer the pending requests to the master PTT controlling server 610, and the group PTT controlling server X2 612 sends two moderator burst requests to transfer the pending requests to the master PTT controlling server 610.

In some implementations, after receiving the pending requests from the group PTT controlling server X1 602 and the group PTT controlling server X2 612, the master PTT controlling server 610 may create a request queue for the merged group. In some cases, the master PTT controlling server 610 may create the request queue of the merged group prior to receiving the pending requests from the group PTT controlling server X1 602 and the group PTT controlling server X2 612. The master controlling server 610 may create the request queue for the merged group at any time after receiving the request to merge group calls. By receiving information of the pending requests such as timestamp, queue position and priority, the master controlling server 610 can place these requests in the queue ordered appropriately with the pending requests in the active group calls X1 and X2 and process accordingly.

The master PTT controlling server 610 may determine to grant the request of the PTT client A 606 in the group X1. At operation 17, the master PTT controlling server 610 may send a moderator burst granted message to the group PTT controlling server X1 602. The moderator burst granted message may be sent using an RTCP APP packet or BFCP. The moderator burst granted message may include the indication of the PTT client that is granted permission to send media. The group PTT controlling server X1 602 may obtain the PTT client information from the moderator burst granted message. After determining that the PTT client A is in the group X1, at operation 18, the group PTT controlling server X1 602 may send a media burst granted message to the PTT participating server A 604, which may further forward the media burst granted message to the PTT client A 606 at operation 19. After receiving the media burst granted message, the PTT client 606 may start to send media to the group PTT controlling server X1 602 which may further forward the media to all the PTT clients in the merged group call.

At operation 20, the master PTT controlling server 610 may also send a moderator burst granted message to the group PTT controlling server X2 612 which includes the information of the PTT client that is granted permission to send media. After receiving the moderator burst granted message, the group PTT controlling server X2 612 determines that the PTT client A that is granted permission to send media is not in the group X2. In response to the determination, at operation 21, the group PTT controlling server X2 612 sends a media burst taken messages to the PTT participating server B 614, which may further forward the media burst taken message to the PTT client B 616 at operation 22, to indicate that the permission to send media is granted to another PTT client in the merged group call. The media burst taken message may indicate the identity of the PTT Client granted permission to send media. The media burst taken message may be sent using an RTCP APP packet or BFCP. In some implementations, the group PTT controlling server X1 602 and the group PTT controlling serer X2 612 may send a media burst taken message to each of the PTT clients in the merged group call except the PTT client that is granted permission to send media. In some implementations, operation 17 and operation 20, as well as other operations, can be concurrent, simultaneous, or overlapping events.

At operation 23, the PTT client B 616 that has media to transmit sends a media burst request to the group PTT controlling server X2 612 to request permission to send media. At operation 24, the group PTT controlling server X2 612 sends a moderator burst request to the master PTT controlling server 610 to indicate the request from the PTT client B 616 requesting permission to send media. In responding to the moderator burst request, at operation 25, the master PTT controlling server 610 sends a moderator burst request confirm message to the group PTT controlling server X2 612 to acknowledge the receipt of the moderator burst request. The master PTT controlling server 610 may grant the PTT client B 616 permission to send media by sending a moderator burst granted message to the group PTT controlling server X2 612.

Figure 7:
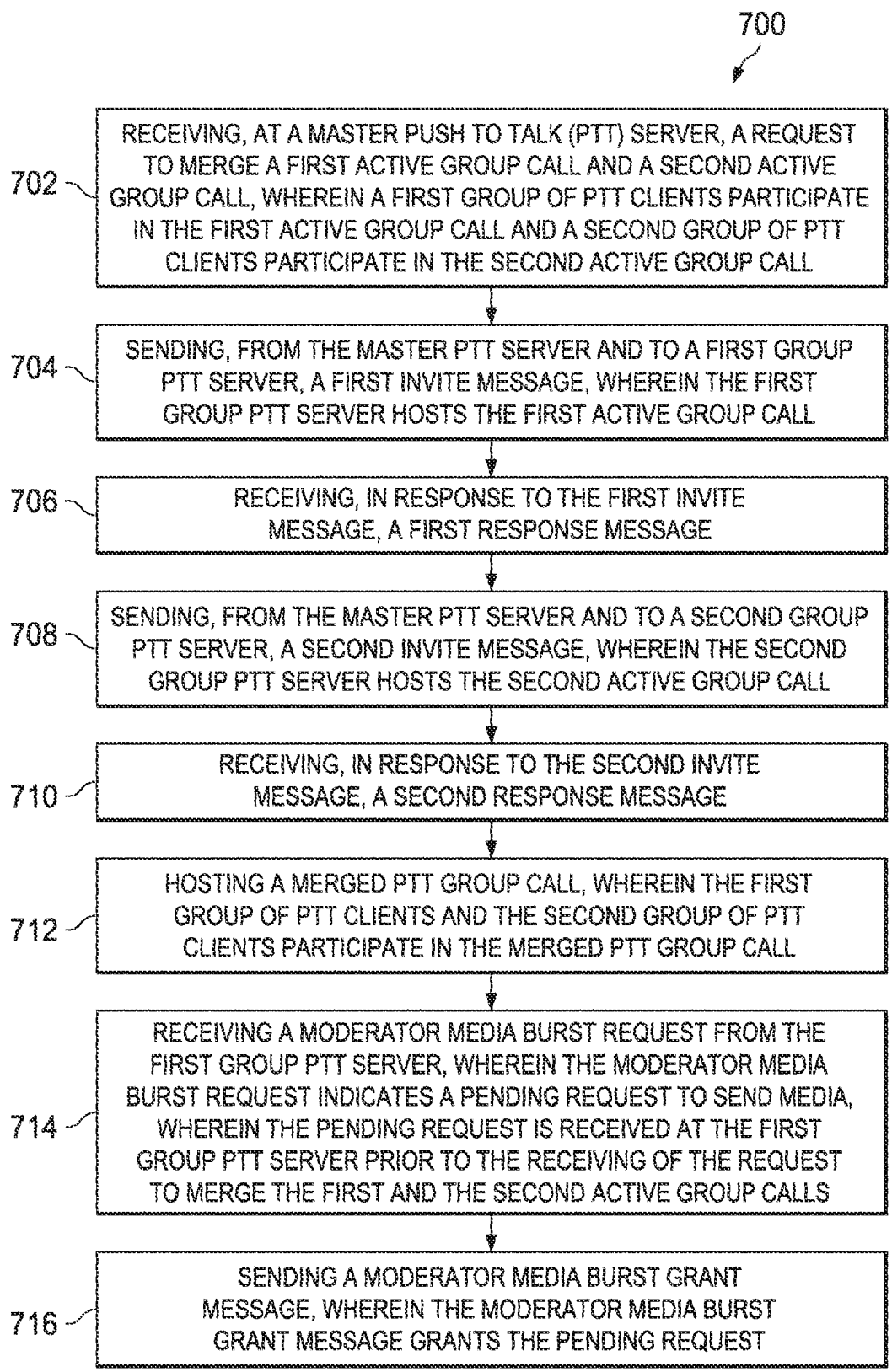
FIG. 7 is a flowchart illustrating an example method for merging active group according to an implementation.

FIG. 7 is a flowchart illustrating an example method 700 for merging active group calls. The method 700 may begin at block 702, where a master Push to Talk (PTT) server, which is also known as a first PTT server, may receive a request to merge a first active group call and a second active group call. A first group of PTT clients may participate in the first active group call and a second group of PTT clients may participate in the second active group call.

At block 704, the master PTT server may send a first invite message to a first group PTT server. The first group PTT server may host the first active group call. In response to the first invite message, at block 706, the master PTT server may receive a first response message from the first group PTT server. At block 708, the master PTT server may send a second invite message to a second group PTT server. The second group PTT server may host the second active group call. In response to the second invite message, at block 710, the master PTT server may receive a second response message from the second group PTT server. At block 712, the master PTT server may host a merged PTT group call. The first group of PTT clients and the second group of PTT clients may participate in the merged PTT group.

At block 714, the master PTT server may receive a moderator media burst request from the first group PTT server. The moderator media burst request may indicate a pending request to send media. The pending request may be received at the first group PTT server prior to the receiving of the request to merge the first and the second active group calls. At block 716, the master PTT server may send a moderator media burst grant message. The moderator media burst grant message may grant the pending request. In some cases, the moderator media burst request may indicate a MBMS bearer that is used by at least one PTT client of the first group of PTT clients for the first active group call. In some cases, the moderator media burst request may indicate a timestamp, a queue position, or a priority of the pending request.

Figure 8:
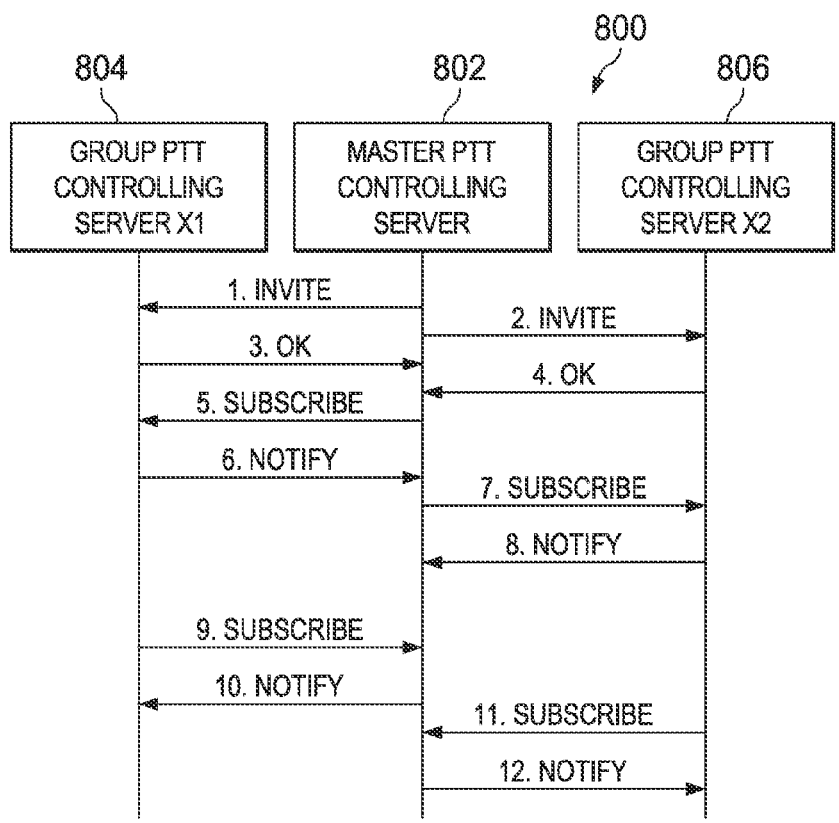
FIG. 8 is a data flow diagram illustrating an example process to provide information of PTT clients in a merged group call according to an implementation.

FIG. 8 is a data flow diagram illustrating an example process 800 to provide information of PTT clients in a merged group call according to an implementation. The data flow diagram includes a master PTT controlling server 802, a group PTT controlling server X1 804 for the active group call X1, and a group PTT controlling server X2 806 for the active group call X2.

At operation 1, the master PTT controlling server 802 sends an invite message to the group PTT controlling server X1 804. This is the same invite message as in FIG. 6A operation 3. In responding to the invite message, at operation 2, the group PTT controlling server X1 804 may send an OK response to the master PTT controlling server 802. This is the same OK response as in FIG. 6A operation 4. At operation 3, the master PTT controlling server 802 sends an invite message to the group PTT controlling server X2 806. This is the same invite message as in FIG. 6A operation 5. In responding to the invite message, at operation 4, the group PTT controlling server X2 806 may send an OK response to the master PTT controlling server 802. This is the same OK response as in FIG. 6A operation 6.

At operation 5, the master PTT controlling server 802 may send a subscribe request to the group PTT controlling server X1 804 to request the information of the PTT clients in the active group call X1. At operation 6, the group PTT controlling server X1 804 may send a notify message to the master PTT controlling server 802 providing information about the PTT clients in the active group call X1. In some cases, the notify message may include the PTT clients that are currently participating in the active group call X1. In some cases, a subsequent notify message may include information that indicates that a PTT client has left or joined the active group call X1. At operation 7, the master PTT controlling server 802 may send a subscribe request to the group PTT controlling server X2 806 to request the information of the PTT clients in the active group call X2. At operation 8, the group PTT controlling server X2 806 may send a notify message to the master PTT controlling server 802 providing information about the PTT clients of the active group call X2. In some cases, the notify message may include the PTT clients that are currently participating in the active group call X2. In some cases, a subsequent notify message may include information that indicates that a PTT client has left or joined the active group call X2. This enables the master PTT controlling server 802 to obtain information about all of the PTT clients in the merged group call. A PTT client may obtain information of other PTT clients in the merged group call by sending a subscribe request to the master PTT controlling server 802 and receiving a notify message from the master PTT controlling server 802.

Alternatively or in combination, at operation 9, the group PTT controlling server X1 804 may send a subscribe request to the master PTT controlling server 802 to request the information of the PTT clients in the active group call X2. At operation 10, the master PTT controlling server 802 may send a notify message to the group PTT controlling server X1 804 providing information about the PTT clients in the active group call X2. In some cases, the notify message may include the PTT clients that are currently participating in the active group call X2. For each group member, the notify message may include the identity of the member, e.g., the Session Initiation Protocol (SIP) URI of the member, and a status indicator. The status indicator may be set to "active" for the members that are currently participating in the group call X2. The status indicator may be set to "inactive" for the members that are not currently participating in the group call X2. The status indicator may be set to "affiliated" for the members that are affiliated but not currently participating in the group call X2. In some cases, a subsequent notify message may include information that indicates that a PTT client has left or joined the active group call X2. At operation 11, the group PTT controlling server X2 806 may send a subscribe request to the master PTT controlling server 802 to request the information of the PTT clients in the active group call X1. At operation 12, the master PTT controlling server 802 may send a notify message to the group PTT controlling server X2 806 providing information about the PTT clients in the active group call X1. For each group member, the notify message may include the identity of the member, e.g., the Session Initiation Protocol (SIP) URI of the member, and a status indicator. The status indicator may be set to "active" for the members that are currently participating in the group call X1. The status indicator may be set to "inactive" for the members that are not currently participating in the group call X1. The status indicator may be set to "affiliated" for the members that are affiliated but not currently participating in the group call X1. In some cases, the notify message may include the PTT clients that are currently participating in the active group call X1. In some cases, a subsequent notify message may include information that indicates that a PTT client has left or joined the active group call X1. In some implementations, the group PTT controlling server X1 804 and the group PTT controlling server X2 806 may have information of the PTT clients in the merged group call. A PTT client of the group X1 may obtain information of the PTT clients in the active group call X2 by sending a subscribe request to and receiving a notify message from the group PTT controlling server X1 804. A PTT client of the group X2 may obtain information of the PTT clients in the active group call X1 by sending a subscribe request to and receiving a notify message from the group PTT controlling server X2 806.

Figure 9:
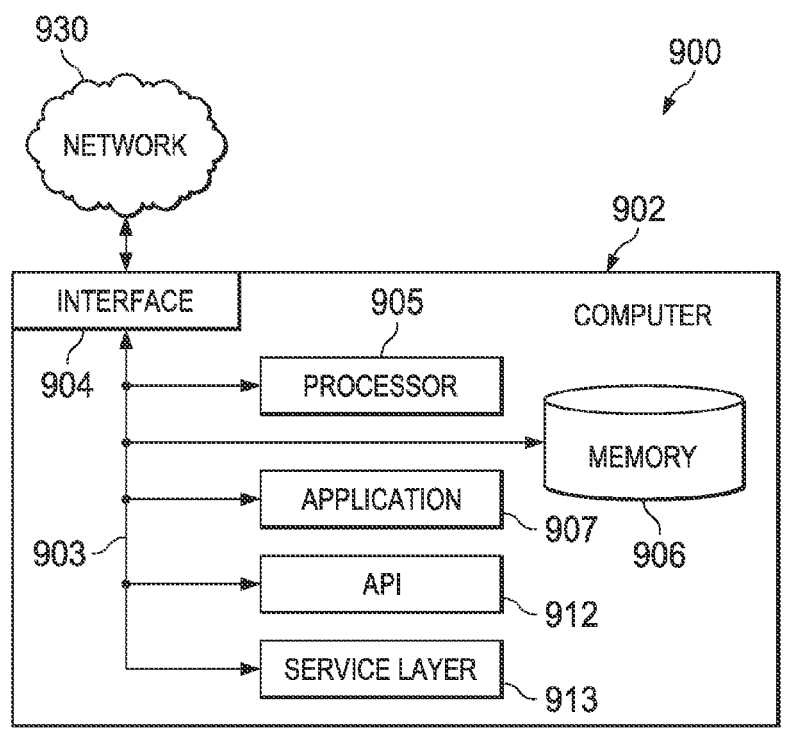
FIG. 9 is a block diagram of an exemplary computer that may be used to merge active group calls according to an implementation.

FIG. 9 is a block diagram 900 of an exemplary computer that may be used to merge active group calls according to an implementation. The illustrated computer 902 is intended to encompass any computing device such as a server, desktop computer, laptop/notebook computer, wireless data port, smart phone, personal data assistant (PDA), tablet computing device, one or more processors within these devices, and/or any other suitable processing device, including both physical and/or virtual instances of the computing device. Additionally, the computer 902 may comprise a computer that includes an input device, such as a keypad, keyboard, touch screen, microphone, speech recognition device, other device that can accept user information, and/or an output device that conveys information associated with the operation of the computer 902, including digital data, visual and/or audio information, or a GUI.

The computer 902 can serve as a client, network component, a server, a database or other persistency, and/or any other component of the system 100. For example, the computer 902 may be used to implement one or more functions of a PTT server or a PTT client. The illustrated computer 902 is communicably coupled with a network 930. In some implementations, one or more components of the computer 902 may be configured to operate within a cloud-computing-based environment.

At a high level, the computer 902 is an electronic computing device operable to receive, transmit, process, store, or manage data and information associated with the system 100. According to some implementations, the computer 902 may also include or be communicably coupled with an application server, e-mail server, web server, caching server, streaming data server, business intelligence (BI) server, and/or other server.

The computer 902 can receive requests over network 930 from a client application (e.g., executing on another computer 902) and respond to the received requests by processing the said requests in an appropriate software application. In addition, requests may also be sent to the computer 902 from internal users (e.g., from a command console or by another appropriate access method), external or third parties, other automated applications, as well as any other appropriate entities, individuals, systems, or computers.

Each of the components of the computer 902 can communicate using a system bus 903. In some implementations, any and/or all the components of the computer 902, both hardware and/or software, may interface with each other and/or the interface 904 over the system bus 903 using an application programming interface (API) 912 and/or a service layer 913. The API 912 may include specifications for routines, data structures, and object classes. The API 912 may be either computer language-independent or -dependent and refer to a complete interface, a single function, or even a set of APIs. The service layer 913 provides software services to the computer 902 and/or the system 100. The functionality of the computer 902 may be accessible for all service consumers using this service layer. Software services, such as those provided by the service layer 913, provide reusable, defined business functionalities through a defined interface. For example, the interface may be software written in JAVA, C++, or other suitable language providing data in Extensible Markup Language (XML) format or other suitable format. While illustrated as an integrated component of the computer 902, alternative implementations may illustrate the API 912 and/or the service layer 913 as stand-alone components in relation to other components of the computer 902 and/or system 100. Moreover, any or all parts of the API 912 and/or the service layer 913 may be implemented as child or sub-modules of another software module, enterprise application, or hardware module without departing from the scope of this disclosure.

The computer 902 includes an interface 904. Although illustrated as a single interface 904 in FIG. 9, two or more interfaces 904 may be used according to particular needs, desires, or particular implementations of the computer 902 and/or system 100. The interface 904 is used by the computer 902 for communicating with other systems in a distributed environment—including within the system 100—connected to the network 930 (whether illustrated or not). Generally, the interface 904 comprises logic encoded in software and/or hardware in a suitable combination and operable to communicate with the network 930. More specifically, the interface 904 may comprise software supporting one or more communication protocols associated with communications such that the network 930 or interface's hardware is operable to communicate physical signals within and outside of the illustrated system 100.

The computer 902 includes a processor 905. Although illustrated as a single processor 905 in FIG. 9, two or more processors may be used according to particular needs, desires, or particular implementations of the computer 902 and/or the system 100. Generally, the processor 905 executes instructions and manipulates data to perform the operations of the computer 902. Specifically, the processor 905 executes the functionality required for merging active group calls.

The computer 902 also includes a memory 906 that holds data for the computer 902 and/or other components of the system 100. Although illustrated as a single memory 906 in FIG. 9, two or more memories may be used according to particular needs, desires, or particular implementations of the computer 902 and/or the system 100. While memory 906 is illustrated as an integral component of the computer 902, in alternative implementations, memory 906 can be external to the computer 902 and/or the system 100.

The application 907 is an algorithmic software engine providing functionality according to particular needs, desires, or particular implementations of the computer 902 and/or the system 100, particularly with respect to functionality required for merging active group calls. For example, application 907 can serve as one or more components/applications described in FIGS. 1-9. Further, although illustrated as a single application 907, the application 907 may be implemented as multiple applications 907 on the computer 902. In addition, although illustrated as integral to the computer 902, in alternative implementations, the application 907 can be external to the computer 902 and/or the system 100.

There may be any number of computers 902 associated with, or external to, the system 100 and communicating over network 930. Further, the terms "client," "user," and other appropriate terminology may be used interchangeably as appropriate without departing from the scope of this disclosure. Moreover, this disclosure contemplates that many users may use one computer 902, or that one user may use multiple computers 902.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

What is claimed is:

1. A method of merging a first active Push to Talk (PTT) group call, in which a first group of PTT clients participate and a first group PTT server acts as a floor control arbitrator, with a second active PTT group call, in which a second group of PTT clients participate and a second group PTT server acts as a floor control arbitrator, the method comprising:
    receiving, at a first PTT server, a request to merge the first active group call and the second active group call into a merged PTT group call, wherein the first group of PTT clients and the second group of PTT clients participate in the merged PTT group call;
    sending, from the first PTT server to the first group PTT server, a first invite message, wherein the first invite message requests that the first active group call join the merged PTT group call and includes an indication that the first PTT server will be a floor control arbitrator for the merged PTT group call;
    receiving, in response to the first invite message, a first response message;
    sending, from the first PTT server to the second group PTT server, a second invite message, wherein the second invite message requests that the second active group call join the merged PTT group call and includes the indication that the first PTT server will be the floor control arbitrator for the merged PTT group call;
    receiving, in response to the second invite message, a second response message; and
    acting as the floor control arbitrator for the merged PTT group call.

2. The method of claim 1, further comprising:
    in response to the first invite message, receiving a moderator media burst request from the first group PTT server, wherein the moderator media burst request indicates a pending request to send media, wherein the pending request is received at the first group PTT server prior to the receiving of the first invite message requesting to merge the first and the second active group calls; and sending, to the first group PTT server, a moderator media burst grant message, wherein the moderator media burst grant message grants the pending request.

3. The method of claim 2, wherein the moderator media burst request indicates a Multimedia Broadcast/Multicast Service (MBMS) bearer that is used by at least one PTT client of the first group of PTT clients for the first active group call.

4. The method of claim 2, wherein the moderator media burst request indicates at least one of a timestamp, a queue position, or a priority of the pending request.

5. The method of claim 1, further comprising:
sending a first subscribe request to the first group PTT server;
receiving, in response to the first subscribe request, a first notify message, wherein the first notify message identifies the first group of PTT clients;
sending a second subscribe request to the second group PTT server; and
receiving, in response to the second subscribe request, a second notify message, wherein the second notify message identifies the second group of PTT clients.

6. The method of claim 1, further comprising:
receiving a subscribe request from the first group PTT server; and
sending, in response to the subscribe request, a first notify message, wherein the first notify message identifies the second group of PTT clients.

7. The method of claim 6, further comprising:
sending a second notify message, wherein the second notify message identifies a PTT client that joins or leaves the merged group call.

8. A device for merging a first active Push to Talk (PTT) group call, in which a first group of PTT clients participate and a first group PTT server acts as a floor control arbitrator, with a second active PTT group call, in which a second group of PTT clients participate and a second group PTT server acts as a floor control arbitrator, the device comprising:
a memory; and
at least one hardware processor communicatively coupled with the memory and configured to:
receive, at a first PTT server, a request to merge the first active group call and the second active group call into a merged PTT group call, wherein the first group of PTT clients and the second group of PTT clients participate in the merged PTT group call;
send, from the first PTT server to the first group PTT server, a first invite message, wherein the first invite message requests that the first active group call join the merged PTT group call and includes an indication that the first PTT server will be a floor control arbitrator for the merged PTT group call;
receive, in response to the first invite message, a first response message;
send, from the first PTT server to the second group PTT server, a second invite message, wherein the second invite message requests that the second active group call join the merged PTT group call and includes the indication that the first PTT server will be the floor control arbitrator for the merged PTT group call;
receive, in response to the second invite message, a second response message; and
act as the floor control arbitrator for the merged PTT group call.

9. The device of claim 8, wherein the at least one hardware processor is further configured to:

in response to the first invite message, receive a moderator media burst request from the first group PTT server, wherein the moderator media burst request indicates a pending request to send media, wherein the pending request is received at the first group PTT server prior to the receiving of the first invite message requesting to merge the first and the second active group calls; and
send a moderator media burst grant message, wherein the moderator media burst grant message grants the pending request.

10. The device of claim 9, wherein the moderator media burst request indicates a Multimedia Broadcast/Multicast Service (MBMS) bearer that is used by at least one PTT client of the first group of PTT clients for the first active group call.

11. The device of claim 9, wherein the moderator media burst request indicates at least one of a timestamp, a queue position, or a priority of the pending request.

12. The device of claim 8, wherein the at least one hardware processor is further configured to:
send a first subscribe request to the first group PTT server;
receive, in response to the first subscribe request, a first notify message, wherein the first notify message identifies the first group of PTT clients;
send a second subscribe request to the second group PTT server; and
receive, in response to the second subscribe request, a second notify message, wherein the second notify message identifies the second group of PTT clients.

13. The device of claim 8, wherein the at least one hardware processor is further configured to:
receive a subscribe request from the first group PTT server; and
send, in response to the subscribe request, a first notify message, wherein the first notify message identifies the second group of PTT clients.

14. The device of claim 13, wherein the at least one hardware processor is further configured to:
send a second notify message, wherein the second notify message identifies a PTT client that joins or leaves the merged group call.

15. A tangible, non-transitory computer-readable medium containing instructions for merging a first active Push to Talk (PTT) group call, in which a first group of PTT clients participate and a first group PTT server acts as a floor control arbitrator, with a second active PTT group call, in which a second group of PTT clients participate and a second group PTT server acts as a floor control arbitrator, the instructions, when executed, cause a computing device to perform operations comprising:
receiving, at a first PTT server, a request to merge the first active group call and the second active group call into a merged PTT group call, wherein the first group of PTT clients and the second group of PTT clients participate in the merged PTT group call;
sending, from the first PTT server to the first group PTT server, a first invite message, wherein the first invite message requests that the first active group call join the merged PTT group call and includes an indication that the first PTT server will be a floor control arbitrator for the merged PTT group call;
receiving, in response to the first invite message, a first response message;
sending, from the first PTT server to the second group PTT server, a second invite message, wherein the second invite message requests that the second active group call join the merged PTT group call and includes the indication that the first PTT server will be the floor control arbitrator for the merged PTT group call;

receiving, in response to the second invite message, a second response message; and acting as the floor control arbitrator for the merged PTT group call.

16. The tangible, non-transitory computer-readable medium of claim 15, wherein the operations further comprise:

in response to the first invite message, receiving a moderator media burst request from the first group PTT server, wherein the moderator media burst request indicates a pending request to send media, wherein the pending request is received at the first group PTT server prior to the receiving of the first invite message requesting to merge the first and the second active group calls; and sending a moderator media burst grant message, wherein the moderator media burst grant message grants the pending request.

17. The tangible, non-transitory computer-readable medium of claim 16, wherein the moderator media burst request indicates a Multimedia Broadcast/Multicast Service (MBMS) bearer that is used by at least one PTT client of the first group of PTT clients for the first active group call.

18. The tangible, non-transitory computer-readable medium of claim 15, wherein the operations further comprise:

sending a first subscribe request to the first group PTT server;

receiving, in response to the first subscribe request, a first notify message, wherein the first notify message identifies the first group of PTT clients;

sending a second subscribe request to the second group PTT server; and receiving, in response to the second subscribe request, a second notify message, wherein the second notify message identifies the second group of PTT clients.

19. The tangible, non-transitory computer-readable medium of claim 15, wherein the operations further comprise:

receiving a subscribe request from the first group PTT server; and sending, in response to the subscribe request, a first notify message, wherein the first notify message identifies the second group of PTT clients.

20. The tangible, non-transitory computer-readable medium of claim 19, wherein the operations further comprise:

sending a second notify message, wherein the second notify message identifies a PTT client that joins or leaves the merged group call.

\* \* \* \* \*